July 30, 1957  A. A. DE RONCK  2,801,019
OUTLET BOX
Filed Feb. 11, 1955
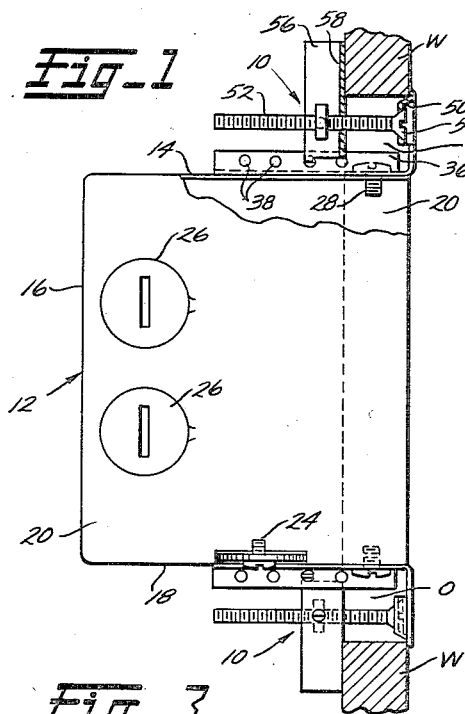
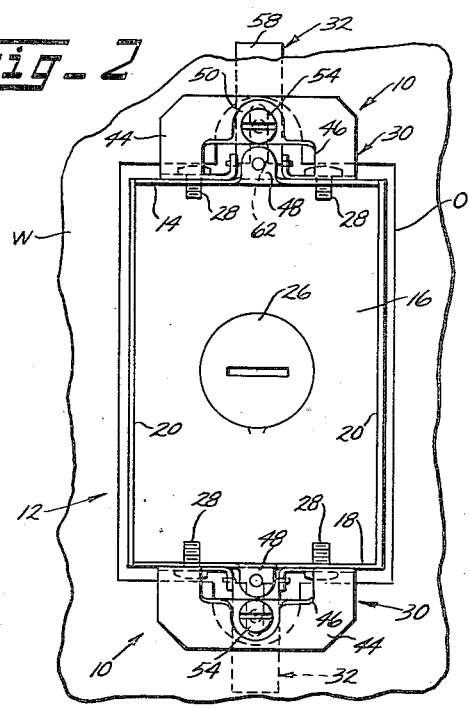
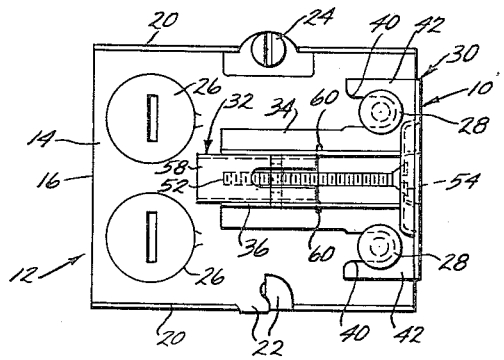
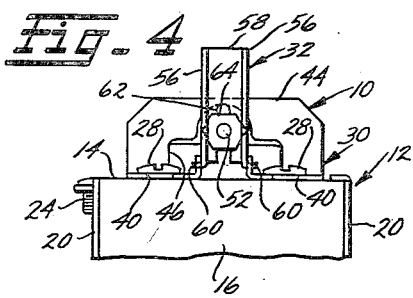
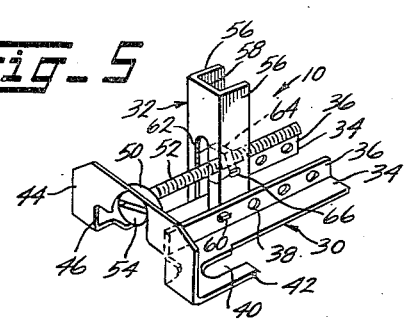
INVENTOR.
ANDREW A. DE RONCK
BY Roger D. McCormick
ATTORNEY United States Patent Office 2,801,019
Patented July 30, 1957

2,801,019
OUTLET BOX

Andrew A. De Ronck, Windsor, Conn., assignor of one-half to Morgan J. Horne, Newington, Conn.

Application February 11, 1955, Serial No. 487,556

3 Claims. (Cl. 220—3.6)

This invention relates to an electrical outlet box and, more particularly, to an improved fastening device for the box, there being one such device provided for each end of the box to anchor the same in a wall opening.

The invention contemplates no modification of the box per se and it should be understood that the fastening device of this invention is adapted for application to any standard or conventional junction box or outlet box for wall switches and sockets or the like.

The general object of the invention is to provide a fastening device of economical manufacture which can easily be secured to a conventional electrical junction or outlet box without modification thereof and which is constructed and arranged to be easily operated to detachably clamp a wall so as to firmly support the box within an opening in the said wall.

Other objects, as well as advantages of the invention, will become apparent to those skilled in the art from the following description taken in connection with the annexed drawing which, by way of preferred example only, illustrates one specific embodiment of the invention and in which, Fig. 1 is a side elevational view of an outlet box with the fastening device of the present invention applied thereto, parts being shown in section to illustrate details, and the box being shown positioned within a wall opening;

Fig. 2 is a front view of the box looking into the same through the wall opening;

Fig. 3 is a top or plan view of the box detached from the wall and with the improved fastening device shown in non-clamping position;

Fig. 4 is a fragmentary rear view of the box showing the upper fastening device in clamping position; and Fig. 5 is a perspective view of the clamping device detached from the box.

In the various views of the drawing, the improved fastening device of the present invention is indicated generally by the reference numeral 10 and a conventional electrical outlet box is indicated generally by the reference numeral 12. As shown in Figs. 1 and 2, there are two fastening devices 10, 10 provided for an outlet box 12, there being one fastening device located at the top of the box and one fastening device similarly located at the bottom of the box.

As will readily be understood by those skilled in the art, the outlet box 12 shown in the drawing is of standard or conventional construction and configuration. That is, the outlet box 12 is in the standard form provided by substantially all electrical manufacturers. More specifically, the box 12 is formed of three major pieces, each of which is a sheet metal stamping. One stamping is formed to provide a top wall 14, a rear wall 16, and a bottom wall 18. The side walls 20, 20 of the box 12 are similar and are formed to be detachably secured to the top and bottom walls 14 and 18 as by interlocking ears 22, 22 and by the screws 24, 24. Thus, there is provided an open front box having side walls, top and bottom walls, and a rear wall each of which is provided with one or more knockout plugs 26, 26 which can be removed to define an opening or openings for the insertion of an electrical wire or conduit.

In further accord with standard practice in the manufacture of electrical outlet boxes, the box 12 is provided with a pair of tapped holes on the top wall 14 adjacent the front edge thereof and a pair of similarly tapped holes which are similarly spaced apart on the bottom wall 18 adjacent the front edge thereof. The screws 28, 28 which are shown threaded into the aforesaid holes are provided with the box to detachably secure a generally L-shaped plate (not shown) to the top and to the bottom thereof. The aforementioned plates are conventional and have a vertically extending portion or leg which engages the surface of a wall adjacent a box-receiving opening therein and wood screws are usually used to secure the said plates and the box to the wall.

The aforesaid "wood screw" method of securing an outlet box in a wall opening has been found to be unsatisfactory. That is, the wood screws may become loose in the wall, particularly in a plaster construction.

In accordance with the present invention, the fastening device 10 is provided as a replacement for the L-shaped clamping plate of conventional or standard manufacture. More specifically, the fastening device 10 is constructed and arranged so that one such fastening device can be secured to the top wall 14 of the outlet box by the screws 28, 28 and so that one such fastening device can be secured to the bottom wall 18 by the screws 28, 28.

The fastening device 10 comprises two main components, namely, a base member 30 and a pivotal clamping member 32, both of which members are formed as sheet metal stampings. In further describing the fastener of the present invention, specific reference will be made to the uppermost fastening device 10, but it should be understood that the bottom fastening device is identical and may be described in a generally similar manner.

The base member 30 is formed with two rearwardly extending spaced apart parallel legs 34, 34 which have upstanding flanges 36, 36 along their adjacent edges. A plurality of spaced apart openings 38, 38 are arranged in registry on the respective flanges 36, 36 to adjustably and pivotally mount the clamping member 32 as will be described hereinafter. Each leg 34 is also provided with a notch 40 defined in a lateral extension 42 of the said leg to receive a screw 28. That is, the notches 40, 40 on the legs 34, 34 are so arranged that when the base member 30 is thrust rearwardly on the top wall 14 of the outlet box from the front edge thereof, the said notches will embrace the threaded portions of the securing screws 28, 28 so that said screws can be tightened in the top wall 14 with the heads of the screws engaging the lateral extensions 42, 42 thereby to secure the base member 30 to the top wall of the outlet box.

The base member 30 is also provided with a vertically upwardly projecting plate or flange 44 on its front edge. It will be observed that the plate or flange 44 is formed integrally with the lateral extensions 42, 42 on the legs 34, 34, and that the said plate has a central recess 46 defined therein. When the anchoring device 10 is secured in position on the outlet box 12 as shown in Fig. 2, the tapped switch-attaching ear 48 on the top wall 14 will be readily accessible within the recess 46 in the plate 44. A rearwardly projecting boss 50 is centrally located in the upper portion of the plate 44 and is provided with a suitable opening to receive an elongated screw or bolt 52 having a drive head 54 located within the boss 50 on the front side thereof.

The clamping member 32 is provided in channel form having side walls 56, 56 and a front wall 58. As shown in Figs. 1 and 2, the clamping member 32 is in clamping position when the front wall 58 is vertical. As shown in Fig. 3, the clamping member 32 is in non-clamping position when the wall 58 is disposed generally horizontally. In operation, the clamping member 32 is pivoted from the horizontal non-clamping position to the vertical clamping position. The means pivotally mounting the member 32 comprise a pair of laterally projecting ears 60, 60 provided on the side walls 56, 56 adjacent the bottom of the front wall 58, viewing the clamping member 32 in a vertical position. The ears 60, 60 are adapted to be selectively engaged within a pair of registering apertures 38, 38 on the respective flanges 36, 36 provided on the legs of the base member 30. That is, before the fastening device 10 is secured to the outlet box 12, the ears 60, 60 on the clamping member 32 are engaged within the pair of openings 38, 38 deemed most suitable for engaging the fastening device 10 to the wall W.

As will be apparent from the drawing, the bolt or screw 52 is utilized to pivot the clamping member 32 from the non-clamping to the clamping position. More specifically, the bolt 52 extends through an elongated slot 62 provided in the front wall 58 of the clamping member 32 and the said bolt is threaded into a nut 64 which is retained between the side walls 56, 56 of the said clamping member. The nut 64 is retained by the side walls 56, 56 by means of a pair of oppositely located apertures 66, 66 in the side walls. That is, two opposite corners of the nut 64 are journaled in the openings 66, 66, the side walls 56, 56 being bent toward one another to assure that the nut cannot escape the retaining openings.

The operation of the fastening devices 10, 10 to secure the outlet box 12 within an opening in the wall W will probably be apparent from the foregoing description of the structure, but it is believed that the understanding of the invention will be enhanced by a brief summary of operation.

After the fastening devices 10, 10 have been secured to the top and to the bottom of the outlet box 12 by means of the screws 28, 28, the clamping screws 52, 52 in the respective fastening devices are loosened so that the pivotal clamping members 32, 32 will lie in substantially horizontal positions. Then, the outlet box is thrust into the selected opening O in the wall W until the vertical plates 44, 44 on the fastening devices engage the surface of the wall W adjacent the opening O. Then, the clamping screws 52, 52 are tightened in the respective nuts 64, 64 to cause the clamping members 32, 32 to be pivoted toward vertical positions and drawn into engagement with the inner or rear surface of the wall W. When the screws 52, 52 have been completely tightened the clamping members 32, 32 will firmly engage the wall W so that the said wall is clamped between the front plates 44, 44 and the pivotal clamping members.

It will readily be understood that the aforedescribed clamping devices offer better security in mounting an outlet box than do the conventional securing means ordinarily associated with said boxes. It will also be understood by those skilled in the art that apparently many changes can be made in the specific structure of the clamping device without departing from the scope and spirit of the invention. Accordingly, it is not my intent to limit the invention to the particular form of clamping device which is shown and described, otherwise than indicated by the claims which follow.

I claim as my invention:

1. In an electrical outlet box of the type adapted to be set in an opening in a vertical wall and having an open front defined by a top, a bottom, and by sides, the combination of a pair of fastening devices secured externally of the box adjacent its open front on the top and on the bottom thereof, respectively, each of said fastening devices comprising a base member having a substantially vertical plate constructed and arranged to engage the front surface of the wall adjacent the wall opening and having a pair of spaced apart legs extending rearwardly along the box, the said pair of legs having substantially vertical flanges along their adjacent edges provided with a plurality of spaced apart registering apertures, a clamping member disposed between said legs and having a pair of oppositely projecting ears selectively engageable in said registering apertures in the flanges whereby the said clamping member can be pivoted between a substantially horizontal position and a substantially vertical position, a nut pivotally supported by said clamping member, and a bolt rotatably supported by said plate and projecting through the wall opening to engage the said nut whereby threading said bolt into said nut will draw the said clamping member from a substantially horizontal position toward a vertical position to engage the rear surface of the wall and clamp the same with said plate.

2. In an electrical outlet box of the type adapted to be set in an opening in a vertical wall and having an open front defined by a top, a bottom, and by sides, the combination of a pair of fastening devices secured externally of the box adjacent its open front on the top and on the bottom thereof, respectively, each of said fastening devices comprising a base member having a substantially vertical plate constructed and arranged to engage the front surface of the wall adjacent the wall opening and having a pair of spaced apart legs extending rearwardly along the box, the said pair of legs having substantially vertical flanges along their adjacent edges provided with a plurality of spaced apart registering apertures, a generally channel-shaped clamping member having a pair of side walls disposed between said flanges and provided with a pair of oppositely projecting ears selectively engageable in said registering apertures in the flanges whereby the said clamping member can be pivoted between a substantially horizontal position and a substantially vertical position, a nut pivotally supported by said clamping member between the side walls thereof, and a bolt rotatably supported by said plate and projecting through the wall opening to engage the said nut, whereby threading said bolt into said nut will draw said clamping member from a substantially horizontal position toward a vertical position to engage the rear surface of the wall and clamp the same with said plate.

3. In an electrical outlet box of the type adapted to be set in an opening in a vertical wall and having an open front defined by a top, a bottom, and by sides, the combination of a pair of fastening devices detachably secured externally of the box adjacent its open front on the top and on the bottom thereof, respectively, each of said fastening devices comprising a base member having a substantially vertical plate constructed and arranged to engage the front surface of the wall adjacent the wall opening and having a pair of spaced apart legs extending rearwardly along the box, the said pair of legs having substantially vertical flanges along their adjacent edges provided with a plurality of spaced apart registering apertures, a generally channel-shaped clamping member having a pair of side walls disposed between said flanges and provided with a pair of oppositely projecting ears selectively engageable in said registering apertures for pivotally supporting the clamping member for movement between a substantially horizontal position and a substantially vertical position, said clamping member also having a front wall provided with a horizontal slot extending from the bottom thereof in viewing the clamping member in a vertical position, a nut pivotally supported by the side walls in the clamping member adjacent said slot, and a bolt rotatably supported by said plate and projecting through the wall opening and through said slot to engage said nut, whereby threading said bolt into said nut will draw said clamping member from a substantially horizontal position toward a vertical position to engage the rear surface of the wall and clamp the same with said plate.

References Cited in the file of this patent

UNITED STATES PATENTS

| | | |
|---|---|---|
| 1,818,317 | Gilmore | Aug. 11, 1931 |
| 2,039,550 | Norton | May 5, 1936 |
| 2,063,923 | Gries | Dec. 15, 1936 |